(12) United States Patent
Okabe

(10) Patent No.: US 9,174,498 B2
(45) Date of Patent: Nov. 3, 2015

(54) PNEUMATIC TIRE

(75) Inventor: Hidetoshi Okabe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/346,697

(22) PCT Filed: Sep. 22, 2011

(86) PCT No.: PCT/JP2011/071683
§ 371 (c)(1),
(2), (4) Date: Jun. 3, 2014

(87) PCT Pub. No.: WO2013/042254
PCT Pub. Date: Mar. 28, 2013

(65) Prior Publication Data
US 2014/0326375 A1 Nov. 6, 2014

(51) Int. Cl.
| B60C 11/01 | (2006.01) |
| B60C 13/02 | (2006.01) |
| B60C 11/02 | (2006.01) |
| B60C 11/24 | (2006.01) |
| B60C 11/04 | (2006.01) |

(Continued)

(52) U.S. Cl.
CPC ............ B60C 11/24 (2013.01); B60C 9/0007 (2013.04); B60C 9/28 (2013.01); B60C 11/01 (2013.01); B60C 11/047 (2013.04); B60C 11/02 (2013.01); *B60C 2011/013* (2013.04); *Y10T 152/10027* (2015.01)

(58) Field of Classification Search
CPC .. B60C 11/01; B60C 2011/013; B60C 13/00; B60C 13/02; B60C 11/02
USPC .............................. 152/531, 538, 523, 209.16
See application file for complete search history.

(56) References Cited

U.S. PATENT DOCUMENTS 4,480,671 A * 11/1984 Giron ........................ 152/209.14
4,995,437 A * 2/1991 Enoki et al. .............. 152/209.16

(Continued)

FOREIGN PATENT DOCUMENTS

| DE | 696 08 768 | 11/2000 |
| JP | S59-19403 | 2/1984 |

(Continued)

OTHER PUBLICATIONS

English machine translation of JP2764610 B2, dated Jun. 1998.*

(Continued)

*Primary Examiner* — Justin Fischer
*Assistant Examiner* — Robert Dye
(74) *Attorney, Agent, or Firm* — Thorpe North & Western

(57) ABSTRACT

The pneumatic tire includes a belt layer that is formed by laminating a pair of cross belts and a circumferential reinforcing layer. Additionally, the pneumatic tire 1 includes a plurality of circumferential main grooves, and a plurality of land portions partitioned and formed by the circumferential main grooves in a tread portion. Also, the pneumatic tire includes a mark on a buttress portion in order to determine the time for renewal of the tire. Also, an outermost circumferential main groove is on an outer side in a tire width direction of the circumferential reinforcing layer. Also, a groove bottom gauge t of the outermost circumferential main groove and a distance D in a tire radial direction from a predetermined intersection point A to the mark have a relationship such that $-1.0 \leq D/t \leq 1.0$, taking the outer side in the tire radial direction to be positive.

15 Claims, 7 Drawing Sheets

(51) Int. Cl.
*B60C 9/00* (2006.01)
*B60C 9/28* (2006.01)

(56) References Cited

U.S. PATENT DOCUMENTS

| | | | |
|---|---|---|---|
| 5,738,740 A * | 4/1998 | Cluzel | 152/527 |
| 5,746,853 A | 5/1998 | Burlacot | |
| 7,784,509 B2 * | 8/2010 | Tamura | 152/209.18 |
| 2006/0137790 A1 * | 6/2006 | de Barsy | 152/209.16 |
| 2008/0078487 A1 * | 4/2008 | Ohara | 152/209.19 |
| 2008/0110543 A1 * | 5/2008 | Song et al. | 152/523 |
| 2010/0006196 A1 * | 1/2010 | Abe | 152/209.16 |
| 2010/0032072 A1 * | 2/2010 | Isobe | 152/527 |
| 2010/0116402 A1 * | 5/2010 | Isobe | 152/526 |

FOREIGN PATENT DOCUMENTS

| | | |
|---|---|---|
| JP | H02-310107 | 12/1990 |
| JP | 2764610 B2 * | 6/1998 |
| JP | 2004-66851 | 3/2004 |
| JP | 2007-106152 | 4/2007 |
| JP | 2010-208505 | 9/2010 |

OTHER PUBLICATIONS

International Search Report dated Jan. 17, 2012, 4 pages, Japan.
Japanese Office Action dated Dec. 27, 2011, 4 pages, Japan.

* cited by examiner

| | Comparative Example 1 | Working Example 1 | Working Example 2 | Working Example 3 | Working Example 4 | Working Example 5 | Working Example 6 | Working Example 7 | Comparative Example 2 | Working Example 8 |
|---|---|---|---|---|---|---|---|---|---|---|
| Number of marks | 1 | 1 | 1 | 1 | 1 | 1 | 1 | 1 | 1 | 2 |
| D/t | 1.2 | 1.0 | 0.8 | 0.5 | 0.0 | -0.5 | -0.8 | -1.0 | -1.2 | D/t=0.5<br>D'/t=-0.5 |
| Cannot be renewed (shoulder wear is too deep) (%) | 0 | 0 | 0 | 0 | 0 | 0 | 0 | 30 | 100 | 0 |
| Cannot be renewed (belt exposed) (%) | 0 | 0 | 0 | 0 | 0 | 0 | 20 | 30 | 50 | 0 |
| Average amount of remaining tire primary life (%) | 40 | 30 | 20 | 10 | 0 | 0 | 0 | 0 | 0 | 0 |

FIG. 8

PNEUMATIC TIRE

BACKGROUND

Conventional pneumatic tires have a circumferential reinforcing layer in a belt layer in order to suppress the radial growth of tires. The technology disclosed in Japanese Unexamined Patent Application Publication No. 2010-208505A is a conventional pneumatic tire that is configured in this manner.

When remaining grooves of a tread portion of heavy duty radial tires mounted on trucks, buses, and the like reach the end of their service life, a tread surface is removed by buffing, and new rubber material is applied to the remaining tire main body (tire casing), which is then reused as a renewed tire.

In tires having a circumferential reinforcing layer in a belt layer, shoulder wear (in particular, step wear) tends to easily occur. If the shoulder wear is large, it is not possible to remove the shoulder wear by buffing, and it is not possible to renew the tire. This is because if a large amount of the shoulder wear is removed by buffing, end portions of the belt layer are exposed.

On the other hand, frequently, it is determined whether or not a tire can be renewed after buffing. In this case, the buffing process may be wasteful, which is detrimental for the user (mainly, the tire dealer that carries out the buffing), so this is not desirable.

SUMMARY

The present invention provides a pneumatic tire for which it is possible to appropriately determine the time for renewal of the tire. The pneumatic tire according to the present invention includes a belt layer formed by laminating a pair of cross belts and a circumferential reinforcing layer, and a plurality of circumferential main grooves and a plurality of land portions partitioned and formed by the circumferential main grooves in a tread portion. In such a pneumatic tire, a mark for determining the time for renewal of the tire is provided in a buttress portion; and, when the circumferential main groove that is on an outermost side in a tire width direction is referred to as an outermost circumferential main groove, and when viewed as a cross-section in a tire meridian direction, when a curved line L is drawn passing through a groove bottom of the outermost circumferential main groove, from the outermost circumferential main groove to a tire ground contact edge and parallel to a profile of the land portion, an intersection point of the curved line L and the profile of the buttress portion is A, the outermost circumferential main groove is to the outer side in the tire width direction of the circumferential reinforcing layer, and a groove bottom gauge t of the outermost circumferential main groove and a distance D in a tire radial direction from the intersection point A to the mark have a relationship such that $-1.0 \leq D/t \leq 1.0$, taking the outer side in the tire radial direction to be positive.

Additionally, with the pneumatic tire according to the present invention, preferably, the belt layer is to the inner side in the tire radial direction of the curved line L.

Additionally, with the pneumatic tire according to the present invention, preferably, a plurality of marks is arranged sequentially in the tire radial direction.

Additionally, with the pneumatic tire according to the present invention, preferably the mark is a recess or a protrusion that extends in the tire circumferential direction along the buttress portion.

Additionally, with the pneumatic tire according to the present invention, the belt layer preferably includes: a high angle belt; a pair of cross belts disposed outward in the tire radial direction of the high angle belt; a belt cover disposed outward in the tire radial direction of the pair of cross belts; and the circumferential reinforcing layer disposed between the pair of cross belts, inward in the tire radial direction of the pair of cross belts, or inward in the tire radial direction of the high angle belt.

Additionally, with the pneumatic tire according to the present invention, a belt angle, as an absolute value, of the belt cover is preferably not less than 10° and not more than 45°.

Additionally, with the pneumatic tire according to the present invention, the belt cords that constitute the circumferential reinforcing layer are steel wire, and the circumferential reinforcing layer has not less than 17 ends/50 mm and not more than 30 ends/50 mm.

Also, in the pneumatic tire according to the present invention, elongation of the belt cords from which the circumferential reinforcing layer is configured when they are components when subjected to a tensile load of 100 N to 300 N is not less than 1.0% and not more than 2.5%.

Also, in the pneumatic tire according to the present invention, the elongation of the belt cords from which the circumferential reinforcing layer is configured when they are in the tire when subjected to a tensile load of 500 N to 1000 N is not less than 0.5% and not more than 2.0%.

Additionally, with the pneumatic tire according to the present invention, the circumferential reinforcing layer is preferably disposed inward in the tire width direction of left and right edges of a narrower cross belt of the pair of cross belts, and a width W of the narrower cross belt and a distance S from an edge of the circumferential reinforcing layer to an edge of the narrower cross belt are preferably in ranges such that $0.03 \leq S/W$.

Additionally, with the pneumatic tire according to the present invention, the circumferential reinforcing layer is disposed inward in the tire width direction of left and right edges of the narrower cross belt of the pair of cross belts, and the width W of the narrower cross belt and a width Ws of the circumferential reinforcing layer are in ranges such that $0.60 \leq Ws/W$.

Additionally, with the pneumatic tire according to the present invention, the width Ws of the circumferential reinforcing layer relative to a tire developed width TDW is in ranges such that $0.65 \leq Ws/TDW \leq 0.80$.

Additionally, the pneumatic tire according to the present invention is applied to a tire having a tire aspect ratio of 70% or less.

In the pneumatic tire according to the present invention, a position of the mark for determining the time for renewal is made appropriate, and this leads to the advantage that it is possible to appropriately determine the time for renewal of the tire.

BRIEF DESCRIPTION OF THE DRAWINGS

FIG. 8 is a table showing the results of performance testing of pneumatic tires according to the embodiment of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, a plurality of modified examples that are described in the embodiment can be freely combined within a scope of obviousness for a person skilled in the art.

Pneumatic Tire

Figure 1:
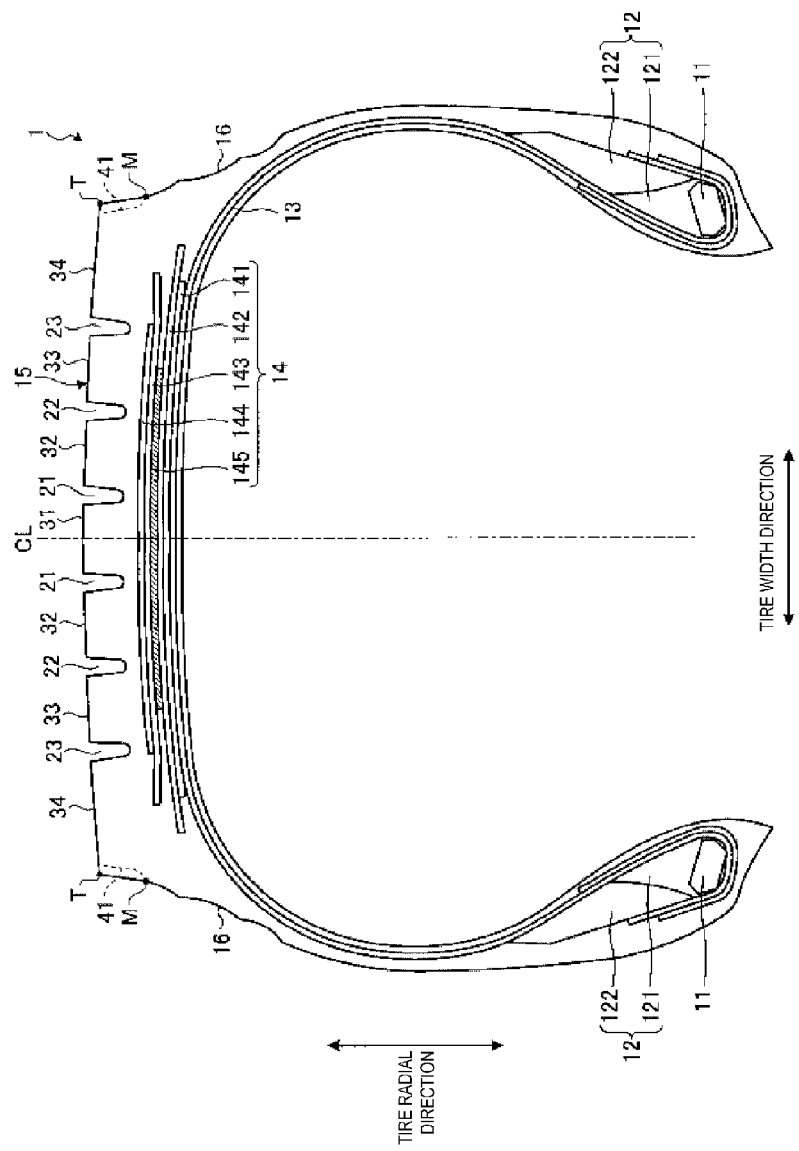
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. As an example of the pneumatic tire 1, FIG. 1 illustrates a radial tire for heavy loads mounted on long-distance transport trucks, buses and the like.

The pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in a tire radial direction so as to reinforce the bead portions. The carcass layer 13 has a single-layer structure, and stretches between the left and right bead cores 11 and 11 in toroidal form, forming a framework for the tire. Additionally, both end portions of the carcass layer 13 are folded toward an outer side in a tire width direction so as to envelop the bead cores 11 and the bead fillers 12, and fixed. The belt layer 14 is formed from a plurality of belt plies 141 to 145 that are laminated, and is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

Additionally, the pneumatic tire 1 includes a plurality of circumferential main grooves 21 to 23 extending in the tire circumferential direction; and a plurality of land portions 31 to 34 partitioned and formed by the circumferential main grooves 21 to 23 in the tread portion (see FIG. 1). The pneumatic tire 1 may have a block pattern, or it may have a rib pattern (not illustrated). The circumferential main grooves 21 to 23 may be straight grooves or may be zigzag shaped grooves. Additionally, "circumferential main grooves" refers to circumferential grooves having a groove width of 5 mm or greater.

In this embodiment, the pneumatic tire 1 has a left-right symmetric construction centered on a tire equatorial plane CL.

Figure 2:
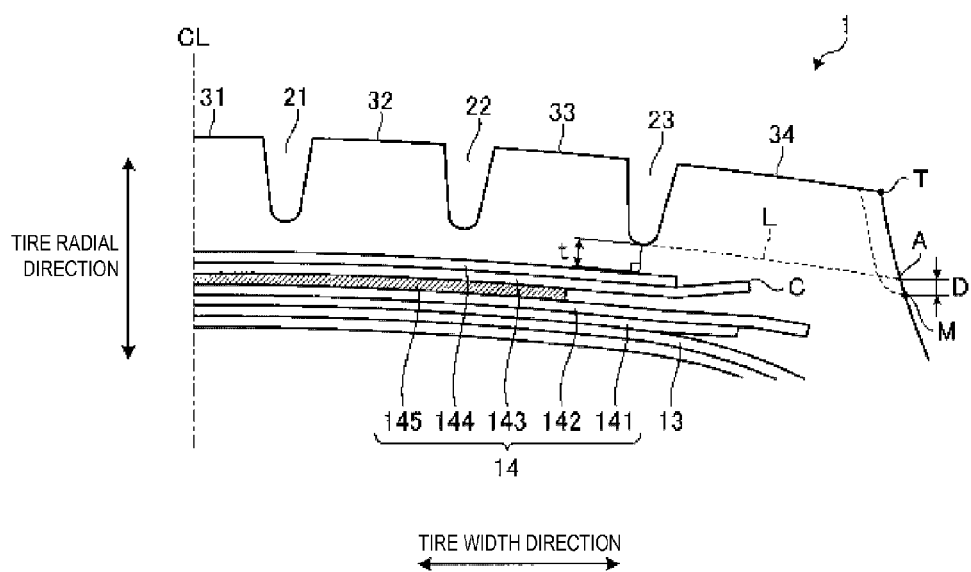
FIG. 2 is an explanatory view illustrating a carcass layer and a belt layer of the pneumatic tire depicted in FIG. 1.
Figure 3:
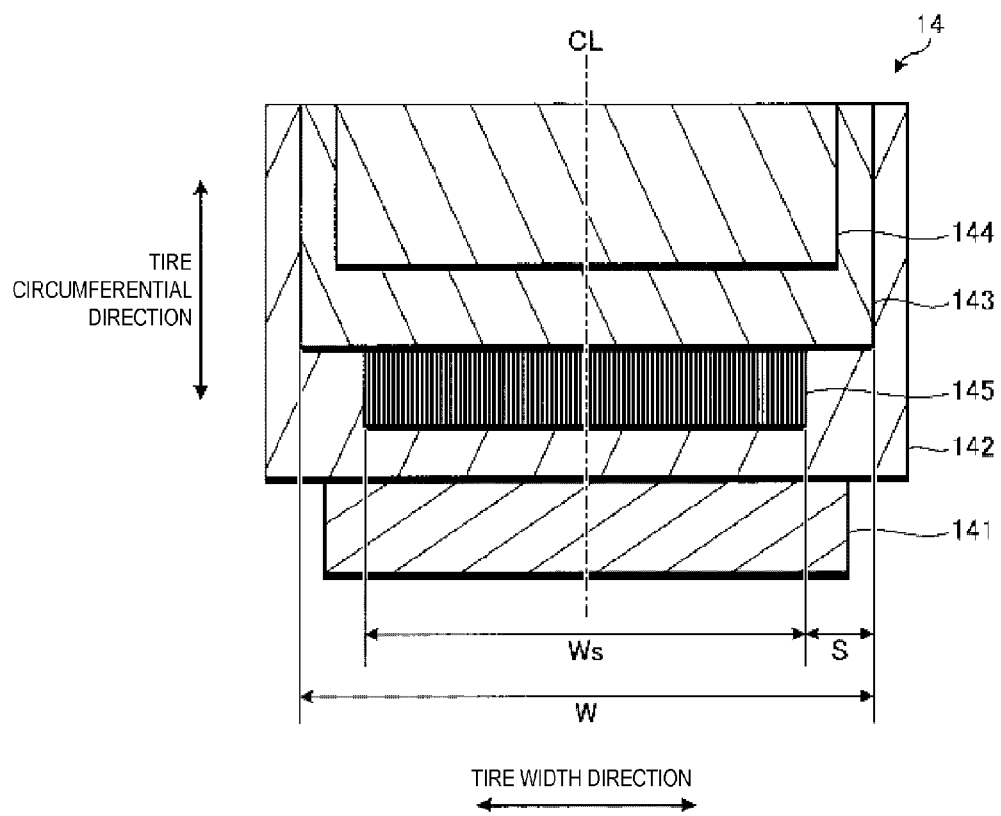
FIG. 3 is an explanatory view illustrating the belt layer depicted in FIG. 2.

FIG. 2 is an explanatory view illustrating the carcass layer 13 and the belt layer 14 of the pneumatic tire 1 depicted in FIG. 1. FIG. 2 illustrates a region on one side of the tread portion demarcated by the tire equatorial plane CL. FIG. 3 is an explanatory view illustrating the belt layer 14 depicted in FIG. 2. FIG. 3 illustrates the laminated structure of the belt layer 14.

The carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a high angle belt 141, a pair of cross belts 142, 143, a belt cover 144, and a circumferential reinforcing layer 145, and is disposed by being wound and mounted onto the periphery of the carcass layer 13 (see FIG. 2).

The high angle belt 141 is configured by a plurality of belt cords formed from steel or organic fibers, covered by coating rubber, and subjected to a rolling process, having a belt angle (inclination angle of the belt cord in a fiber direction with respect to the tire circumferential direction), as an absolute value, of not less than 40° and not more than 60°. Also, the high angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle, as an absolute value, of not less than 10° and not more than 30°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as an "inner-side cross belt", and the cross belt 143 positioned on the outer side in the tire radial direction is referred to as an "outer-side cross belt". Three or more cross belts may be disposed so as to be laminated (not illustrated). Also, the pair of cross belts 142, 143 are disposed so as to be laminated outward in the tire radial direction of the high angle belt 141.

The belt cover 144 is configured by a plurality of belt cords formed from steel or organic fibers, covered by coating rubber, and subjected to a rolling process, having a belt angle, as an absolute value, of not less than 10° and not more than 45°. Also, the belt cover 144 is disposed so as to be laminated outward in the tire radial direction of the cross belts 142, 143. In this embodiment, the belt cover 144 has the same belt angle as the outer-side cross belt 143, and, is disposed in the outermost layer of the belt layer 14.

The circumferential reinforcing layer 145 is constituted by belt cords formed from a rubber coated steel wire wound spirally at a slant within a range of ±5° with respect to the tire circumferential direction. Also, the circumferential reinforcing layer 145 is disposed so as to be interposed between the pair of cross belts 142, 143. Also, the circumferential reinforcing layer 145 is disposed inward in the tire width direction of left and right edges of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the durability of the tire is improved.

In the pneumatic tire 1, the belt layer 14 may have an edge cover (not illustrated). Generally, the edge cover is configured by a plurality of belt cords formed from steel or organic fibers covered by coating rubber and subjected to a rolling process, having a belt angle, as an absolute value, of not less than 0° and not more than 5°. Also, the edge cover is disposed outward in the tire radial direction of the left and right edges of the outer-side cross belt 143 (or the inner-side cross belt 142). The edge covers improve the uneven wear resistance performance of the tire by alleviating the difference in radial growth between a center region and a shoulder region of the tread portion, by exhibiting a band effect.

Moreover, in the pneumatic tire 1, the belt cords from which the circumferential reinforcing layer 145 is configured are steel wire, and preferably, the number of ends of the circumferential reinforcing layer 145 is not less than 17 ends/50 mm and not more than 30 ends/50 mm. Moreover, the diameter of the belt cord is preferably within a range of not less than 1.2 mm and not more than 2.2 mm. In a configuration in which the belt cords are formed from a plurality of cords twisted together, the belt code diameter is measured as the diameter of a circle that circumscribes the belt cord.

Also, in the pneumatic tire 1, (a) the elongation of the belt cords from which the circumferential reinforcing layer 145 is configured when they are components (when they are material prior to forming the green tire) when subjected to a tensile load of 100 N to 300 N is preferably not less than 1.0% and not more than 2.5%. Moreover, (b) the elongation of the belt cords of the circumferential reinforcing layer 145 when in the tire (the state when taken from the tire product) when subjected to a tensile load of 500 N to 1000 N is preferably not less than 0.5% and not more than 2.0%. The belt cords (high elongation steel wire) have a good elongation ratio when a low load is applied compared with normal steel wire, so they have the property that they can withstand the loads that are applied. Therefore, in the case of (a) above, it is possible to improve the durability of the circumferential reinforcing layer 145 during manufacture, and in the case of (b) above, it is possible to improve the durability of the circumferential reinforcing layer 145 when the tire is used, and these points are desirable. The elongation of the belt cords is measured in conformance with JIS G3510.

In the pneumatic tire 1, the circumferential reinforcing layer 145 is configured by winding a single steel wire in a spiral manner. However, the configuration is not limited thereto, and the circumferential reinforcing layer 145 may also be configured by a plurality of wires wound spirally around side-by-side to each other (multiple winding structure). In this case, preferably, the number of wires is 5 or less. Also, preferably, the width of winding per unit when 5 wires are wound in multiple layers is not more than 12 mm. In this way, a plurality (not less than 2 and not more than 5) of wires can be wound properly at a slant within a range of ±5° with respect to the tire circumferential direction.

Mark for Determining the Time for Renewal

When the remaining grooves of the tread portion of heavy duty radial tires mounted on trucks, buses, and the like reach the end of their service life, the tread surface is removed by buffing, and new rubber material is applied to the remaining tire main body (tire casing), which is then reused as a renewed tire.

In tires with a circumferential reinforcing layer in the belt layer, in particular, in tires with an aspect ratio of not more than 70% with a circumferential main groove on the outer side in the tire width direction from the circumferential reinforcing layer, shoulder wear (in particular, step wear) tends to easily occur. If the shoulder wear is large, it is not possible to remove the shoulder wear by buffing, and it is not possible to renew the tire. This is because if a large amount of the shoulder wear is removed by buffing, the end portions of the belt layer are exposed.

On the other hand, frequently, it is determined whether or not a tire can be renewed after buffing. In this case, the buffing process may be wasteful, which is detrimental for the user (mainly, the tire dealer that carries out the buffing), so this is not desirable.

Therefore, the pneumatic tire 1 has the following configuration in order that the user can appropriately determine the time for renewal of the tire.

First, the pneumatic tire 1 includes a mark M on a buttress portion in order to determine the time for renewal of the tire (see FIG. 2). The mark M is, for example, indicated as the end portion on the inner side in the tire radial direction of a button (for example, a shallow groove, a decorative groove, or the like) formed on the surface of the buttress portion, a groove bottom of an edge of a lug groove in the shoulder land portion 34 that is open toward the buttress portion, a recess or a protrusion that extends in the tire circumferential direction along the buttress portion, and the like.

The buttress portion is the portion that connects the profile of the tread portion and the profile of the side wall portion, and constitutes the side wall surface of the shoulder land portion on the outer side in the tire width direction.

Also, the circumferential main groove 23 that is on the outermost side in the tire width direction is referred to as the outermost circumferential main groove. Also, when viewed as a cross-section in the tire meridian direction, a curved line L is drawn passing through the groove bottom of the outermost circumferential main groove 23 parallel to the profile of the shoulder land portion 34 from the outermost circumferential main groove 23 to the tire ground contact edge T. Also, the intersection point of the curved line L and the buttress portion is at A.

In this case, the outermost circumferential main groove 23 is on the outer side in the tire width direction of the circumferential reinforcing layer 145. Also, a groove bottom gauge t of the outermost circumferential main groove 23 and a distance D in the tire radial direction from the intersection point A to the mark M have the relationship such that $-1.0 \leq D/t \leq 1.0$, taking the outer side in the tire radial direction to be positive.

The groove bottom gauge t is the length of a normal line drawn from the groove bottom of the outermost circumferential main groove 23 to the belt cord surface of the outermost layer of the belt layer 14 (in the configuration in FIG. 2, the belt cover 144). Normally in heavy duty pneumatic tires, the groove bottom gauge t is set to be not less than 4 mm and not more than 8 mm.

Also, the tire ground contact edge T and the distance D are measured with the tire assembled on a standard rim with the regular internal pressure applied under no load conditions.

Also, the groove bottom gauge t is measured with the tire assembled on a standard rim filled with the regular internal pressure under no load conditions. In this case, the following measurement method is, for example, used. First, a tire unit is applied to the imaginary line of a tire profile measured by a laser profiler and fixed with tape or the like. Then, the gauge t that is to be measured is measured with a caliper or the like. The laser profiler used here is a tire profile measuring device (manufactured by Matsuo Co., Ltd.).

Herein, "standard rim" refers to an "applicable rim" defined by the Japan Automobile Tire Manufacturers Association (JATMA), a "design rim" defined by the Tire and Rim Association (TRA), or a "measuring rim" defined by the European Tire and Rim Technical Organisation (ETRTO). "Regular internal pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

For example, in the configuration in FIG. 2, the pneumatic tire 1 has a shallow groove-shaped button 41 that extends in the tire radial direction on the surface of the buttress portion. Also, the end portion of the button 41 on the outer side in the tire radial direction is open onto the road contact surface of the shoulder land portion 34, and the end portion on the inner side in the tire radial direction terminates on the inner side in the tire radial direction of the intersection point A. Also, the end portion of the button 41 on the inner side in the tire radial direction constitutes the mark M for determining the time for renewal of the tire.

In the pneumatic tire 1, as wear progresses, shoulder wear occurs on the edge of the shoulder land portion 34 on the outer side in the tire width direction. Before the shoulder wear reaches the mark M, it is determined that the tire can be renewed, and when the shoulder wear exceeds the mark M, it is determined that the tire cannot be renewed. For example, in the configuration in FIG. 2, it can be determined whether or not the tire can be renewed by whether or not the end portion (the mark M) of the button 41 on the inner side in the tire radial direction has been eliminated by shoulder wear. Specifically, when the shoulder wear reaches the mark M, it is the recommended time for renewal. Therefore, by making the position of the mark M appropriate, it is possible to appropriately determine the time for renewal of the tire.

In particular, the position of the mark M is made appropriate by making the groove bottom gauge t of the outermost circumferential main grooves and the distance D from the intersection point A to the mark M in the tire radial direction have a relationship such that $-1.0 \leq D/t \leq 1.0$. In this way, it is possible to appropriately determine renewal time of the tire.

In the pneumatic tire 1, preferably the groove bottom gauge t and the distance D are set so as to have a relationship such that $-1.0 \leq D/t \leq 0$, and more preferably is set so as to have a relationship such that $-0.5 \leq D/t \leq -0.1$, taking the outer side in the tire radial direction to be positive (see FIG. 2). By arranging the mark M on the inner side in the tire radial direction from the intersection point A in this manner, it is possible to delay the time for renewal of the tire and extend the primary life of the tire. Also, by setting the groove bottom gauge t and the distance D so as to have a relationship such that $-1.0 \leq D/t$ (and further, $-0.5 \leq D/t$), it is possible to determine with good accuracy whether or not the tire can be renewed.

Also, in the pneumatic tire 1, preferably the belt layer 14 is on the inner side in the tire radial direction from the curved line L (see FIG. 2). For example, in the configuration in FIG. 2, an end portion C of the outer-side cross belt 143 is a position that is closest to the curved line L, and, is located on the inner side in the tire radial direction from the curved line L.

In this case, when viewed as a cross-section in the tire meridian direction, when a curved line (not illustrated) is drawn passing through the mark M (in FIG. 2, the end portion of the button 41 on the outer side in the tire radial direction) parallel to the curved line L, preferably, the position of the mark M is defined so that the distance between the curved line and the belt layer 14 (in FIG. 2, the end portion C of the cross belt 143 on the outer radial side) is 3 mm or greater. This distance is the thickness (the gauge on the belt) of the rubber material from the belt layer 14 to the buffed surface, when the shoulder wear reaches the mark M and the buffing process is carried out. In this way, the exposure of the belt layer to the buffing surface due to the buffing process is prevented.

Modified Examples

FIGS. 4 to 7 are explanatory views illustrating modified examples of the pneumatic tire 1 depicted in FIG. 1. These drawings illustrate variations of the mark M. In these drawings, constituents that are the same as constituents illustrated in FIGS. 1 to 3 are given the same reference numeral, and their explanations are omitted.

In the configuration in FIG. 2, the pneumatic tire 1 has the shallow groove-shaped button 41 that extends in the tire radial direction on the surface of the buttress portion, and the end portion of the button 41 on the inner side in the tire radial direction functions as the mark M.

Figure 4:
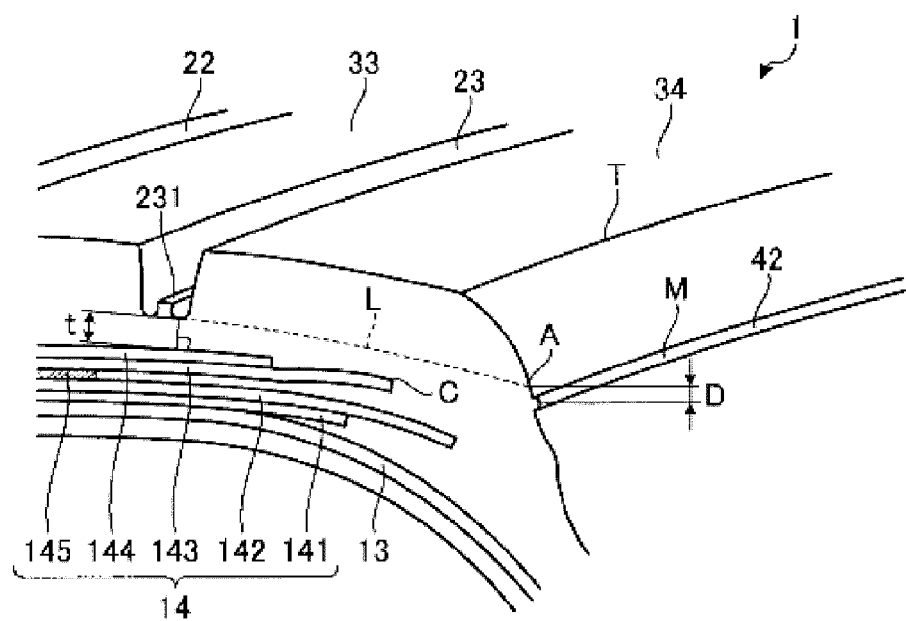
FIG. 4 is an explanatory view illustrating a modified example of the pneumatic tire depicted in FIG. 1.

In contrast, in the modified example in FIG. 4, the pneumatic tire 1 has a narrow rib-shaped protrusion 42 extending in the tire circumferential direction along the buttress portion, and the protrusion 42 functions as the mark M. Likewise, in the modified example in FIG. 5, the pneumatic tire 1 has a narrow groove-shaped recess 43 extending in the tire circumferential direction along the buttress portion, and this recess 43 functions as the mark M. Also, the recess 43 and the protrusion 42 are arranged on the inner side in the tire radial direction from the intersection point A of the curved line L and the profile of the buttress portion. Therefore, the groove bottom gauge t of the outermost circumferential main groove 23 and the distance D from the intersection point A to the mark M in the tire radial direction have a relationship such that $-0.1 \leq D/t \leq 0$. In this way, the mark M may be constituted from the recess 43 or the protrusion 42 formed in the buttress portion.

Figure 5:
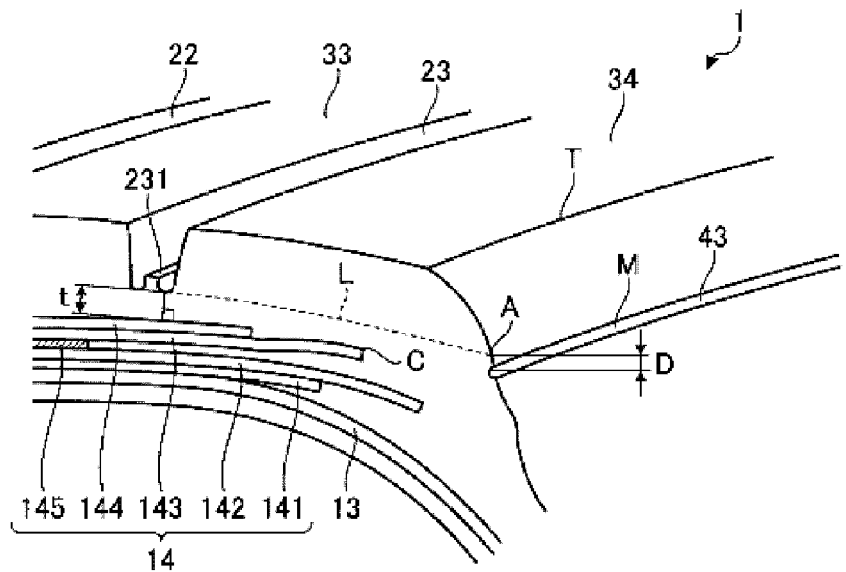
FIG. 5 is an explanatory view illustrating a modified example of the pneumatic tire depicted in FIG. 1.

In the modified examples illustrated in FIGS. 4 and 5, the outermost circumferential main groove 23 has a protrusion 231 to prevent stone holding in the bottom of the groove. In this configuration, the groove bottom gauge t is measured as the length of a normal line drawn from the position of the maximum groove depth of the outermost circumferential main groove 23 to the belt cord surface of the outermost layer of the belt layer 14 (in the configuration in FIG. 4, the belt cover 144). Also, the curved line L is a curved line that passes through the position of the maximum groove depth of the outermost circumferential main groove 23 parallel to the profile of the shoulder land portion 23 from the outermost circumferential main groove 23 to the tire ground contact edge T.

Figure 6:
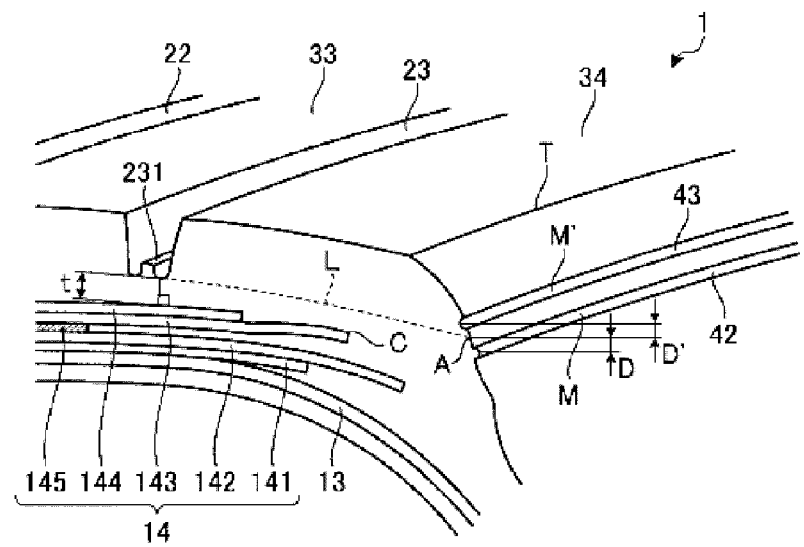
FIG. 6 is an explanatory view illustrating a modified example of the pneumatic tire depicted in FIG. 1.
Figure 7:
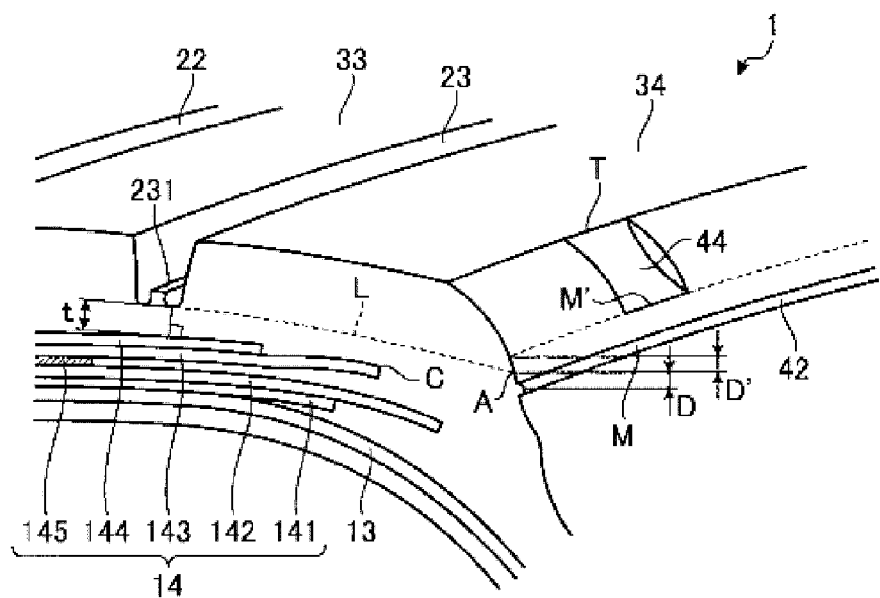
FIG. 7 is an explanatory view illustrating a modified example of the pneumatic tire depicted in FIG. 1.

Also, in the modified example of FIG. 6, the pneumatic tire 1 has a pair of marks M, M' on the buttress portion. A first mark M is formed from the narrow rib-shaped protrusion 42 that extends in the tire circumferential direction along the buttress portion, and is positioned on the inner side in the tire radial direction from the intersection point A of the curved line L and the profile of the buttress portion. Also, the groove bottom gauge t of the outermost circumferential main groove and the distance D in the tire radial direction from the intersection point A to the mark M have a relationship such that $-0.1 \leq D/t \leq 0$, taking the outer side in the tire radial direction to be positive. A second mark M' is formed from the narrow groove-shaped recess 43 that extends in the tire circumferential direction along the buttress portion, and is positioned on the outer side in the tire radial direction from the intersection point A. Also, the groove bottom gauge t and the distance D' in the tire radial direction from the intersection point A to the mark M' has a relationship such that $0 < D'/t \leq 1.0$, taking the outer side in the tire radial direction to be positive.

In the configuration with the pair of marks M, M' arranged sequentially in the tire circumferential direction in this way, it is possible to indicate the recommended time for renewal of the tire sequentially, or it is possible to indicate the space between the marks M, M' as the recommended time for renewal. Therefore, it is possible to more appropriately indicate the recommended time for renewal.

These marks M, M' can be arranged as desired in ranges such that 31 $1.0 \leq D/t \leq 1.0$ and $-1.0 \leq D'/t \leq 1.0$.

Additional Data

Also, in the configuration illustrated in FIG. 3, the circumferential reinforcing layer 145 is disposed inward in the tire width direction of left and right edges of the narrower cross belt 143 of the pair of cross belts 142, 143. Additionally, a width W of the narrower cross belt 143 and a distance S from the edge of the circumferential reinforcing layer 145 to the edge of the narrower cross belt 143 are preferably in ranges such that $0.03 \leq S/W$. This point is the same even if the circumferential reinforcing layer 145 has a configuration with a divided structure (not illustrated).

For example, in the configuration in FIG. 3, the outer-side cross belt 143 has a narrow width structure, and the circumferential reinforcing layer 145 is disposed inward in the tire width direction of the left and right edges of the outer-side cross belt 143. Also, the outer-side cross belt 143 and the circumferential reinforcing layer 145 are disposed so as to be left-right symmetric centered on the tire equatorial plane CL. Also, in a region demarcated by the tire equatorial plane CL, a positional relationship S/W of the edge of the outer-side cross belt 143 and the edge of the circumferential reinforcing layer 145 is made appropriate to be within the ranges as described above.

In this configuration, the positional relationship S/W of the edges of the cross belts 142, 143 and the edges of the circumferential reinforcing layer 145 is made appropriate, and it is possible to reduce the strain that is produced in the rubber material around the circumferential reinforcing layer 145.

The width W and the distance S are measured as distances in the tire width direction when viewed as a cross-section in a tire meridian direction. Also, there is no upper limit to the value of S/W in particular, but it is restricted by the relationship of a width Ws of the circumferential reinforcing layer 145 and the width W of the narrower cross belt 143.

Also, the width Ws of the circumferential reinforcing layer 145 is set to be $0.60 \leq Ws/W$. The width Ws of the circumferential reinforcing layer 145, when the circumferential reinforcing layer 145 has a divided structure (not illustrated), is the sum of the widths of each divided portion.

Effect

As described above, the pneumatic tire 1 includes the belt layer 14 that is formed by laminating the pair of cross belts 142, 143 and the circumferential reinforcing layer 145 (see FIGS. 1 to 3). Additionally, the pneumatic tire 1 includes a plurality of circumferential main grooves 21 to 23, and a plurality of land portions 31 to 34 partitioned by the circumferential main grooves 21 to 23 in the tread portion. Also, the pneumatic tire 1 includes the mark M on the buttress portion in order to determine the time for renewal of the tire. Also, the outermost circumferential main groove 23 is on the outer side in the tire width direction of the circumferential reinforcing layer 145. Also, the groove bottom gauge t of the outermost circumferential main groove 23 and the distance D in the tire radial direction from the predetermined intersection point A to the mark M have a relationship such that $-1.0 \leq D/t \leq 1.0$, taking the outer side in the tire radial direction to be positive.

In this configuration, the position of the mark M for determining the time for renewal is made appropriate, and this leads to the advantage that it is possible to appropriately determine the time for renewal of the tire.

Also, in the pneumatic tire 1, the belt layer 14 is to the inner side in the tire radial direction from the curved line L (see FIG. 2). As a result, this leads to the advantage that when the tire is buffed using the mark M as a judgment criterion, it is possible to suppress exposure of the belt layer.

Also, in the pneumatic tire 1, the plurality of marks M, M' is arranged sequentially in the tire radial direction (see FIG. 6). This leads to the advantage that it is possible to more appropriately indicate the recommended time for renewal.

Also, in the pneumatic tire 1 according to the present invention, the mark M is a recess or a protrusion that extends in the tire circumferential direction along the buttress portion (see FIG. 2). In this configuration, it is possible to clearly visually recognize the elimination of the mark M, compared with the configuration in which the mark M is a button or a lug groove formed in the buttress portion. This leads to the advantage that the user can more appropriately determine the recommended time for renewal.

Also, in the pneumatic tire 1, a plurality of belt plies includes the high angle belt 141, the pair of cross belts 142, 143 disposed outward in the tire radial direction of the high angle belt 141, the belt cover 144 disposed outward in the tire radial direction of the pair of cross belts 142, 143, and the circumferential reinforcing layer 145 disposed between the pair of cross belts 142, 143, inward in the tire radial direction from the pair of cross belts 142, 143, or inward in the tire radial direction from the high angle belt 141 (see FIG. 2 and FIG. 3).

Also, in the pneumatic tire 1, the belt cover 144 has a belt angle, as an absolute value, of not less than 10° and not more than 45°. This has the advantage that the tread portion is properly protected.

Moreover, in the pneumatic tire 1, the belt cords from which the circumferential reinforcing layer 145 is configured are steel wire, and the number of ends of the circumferential reinforcing layer 145 is not less than 17 ends/50 mm and not more than 30 ends/50 mm.

Also, in the pneumatic tire 1, the elongation of the belt cords from which the circumferential reinforcing layer 145 is configured when they are components when subjected to a tensile load of 100 N to 300 N is not less than 1.0% and not more than 2.5%.

In the pneumatic tire 1, the elongation of the belt cords from which the circumferential reinforcing layer 145 is configured when they are in the tire when subjected to a tensile load of 500 N to 1000 N is not less than 0.5% and not more than 2.0%.

Also, in the pneumatic tire 1, the circumferential reinforcing layer 145 is disposed inward in the tire width direction from the left and right edges of the narrower cross belt 143 of the pair of cross belts 142, 143 (see FIG. 3). Also, the width W of the narrower cross belt 143 and the distance S from the edge of the circumferential reinforcing layer 145 to the edge of the narrower cross belt 143 are in the ranges such that $0.03 \leq S/W$. In such a configuration, there is an advantage in that the positional relationship S/W between the edges of the cross belts 142, 143 and the edges of the circumferential reinforcing layer 145 is made appropriate to reduce the strain that is produced in the rubber material around the circumferential reinforcing layer 145.

Also, in the pneumatic tire 1, the width W of the narrower cross belt 143 and the width Ws of the circumferential reinforcing layer 145 have a relationship such that $0.60 \leq Ws/W$ (see FIG. 3).

In the pneumatic tire 1, the width Ws of the circumferential reinforcing layer 145 relative to a tire developed width TDW (not illustrated) is within the ranges such that 0.65≤Ws/TDW≤0.80. In such a configuration, the width Ws and the tire developed width TDW are in the ranges such that Ws/TDW≤0.80, so the width Ws of the circumferential reinforcing layer 145 is made appropriate. This has the advantage that fatigue failure of the belt cords is suppressed at the end portion of the circumferential reinforcing layer 145. Also, the width Ws and the tire developed width TDW are in the ranges such that 0.65≤Ws/TDW, this has the advantage that the ground contact shape of the tire is made appropriate, and the tire uneven wear resistance performance is improved.

Application Example

Also, in the pneumatic tire 1, in the state where the tire is assembled on a standard rim, the regular inner pressure is applied to the tire, and the regular load is applied, preferably an aspect ratio HW is within the ranges such that 40%≤HW≤70%. In addition, the pneumatic tire 1, as in this embodiment, is preferably used as a pneumatic tire for heavy loads, such as buses, trucks and the like. With tires having this aspect ratio HW, in particular, pneumatic tires for heavy loads such as buses, trucks and the like, the ground contact shape can easily become an hourglass-shape, and the occurrence of uneven wear is significant. Therefore, by applying the configuration of the pneumatic tire 1 to a tire having this aspect ratio HW, it is possible to more appropriately indicate the recommended time for renewal.

EXAMPLES

FIG. 8 is a table showing the results of performance testing of pneumatic tires according to embodiments of the present invention.

In these performance tests, a plurality of pneumatic tires having positions of the mark M for indicating the time for renewal that were different from each other were evaluated to determine whether or not the mark M was appropriately exhibited (see FIG. 8).

Specifically, pneumatic tires having a tire size of 445/50R22.5 were assembled on a "design rim" stipulated by TRA, and the air pressure in "Tire Load Limits at Various Cold Inflation Pressures" stipulated by TRA, and the maximum value of "Tire Load Limits at Various Cold Inflation Pressures" were applied to these pneumatic tires 1. Also, a 6×4 tractor and trailer test vehicle to which the pneumatic tires were mounted was driven, and the results for 100 tires of each specification that were worn to the mark M were extracted. Then, the buffing operation was carried out on these tires, and the tire casings were evaluated visually to determine whether or not they could be renewed. Also, the remaining amount of primary life was evaluated by calculating the average value of the main groove depth/amount of remaining groove in the total circumferential direction (excluding the wear indicator). If this evaluation is not more than 30, it can be said that the mark M is functioning appropriately.

The pneumatic tires 1 according to working examples 1 to 7 had the configuration illustrated in FIG. 4, and were provided with the protrusion 42 that formed the mark M on the buttress portions on the left and right of the tire. Also, the pneumatic tire 1 according to working example 8 had the configuration illustrated in FIG. 6, and was provided with the pair of marks M, M'.

As indicated by the test results, it can be seen that, in the pneumatic tires 1 according to working examples 1 to 8, the marks M, M' are functioning appropriately.

What is claimed is:

1. A pneumatic tire, comprising a belt layer formed by laminating a pair of cross belts and a circumferential reinforcing layer, and a plurality of circumferential main grooves and a plurality of land portions partitioned by the circumferential main grooves in a tread portion, wherein
a mark for determining the time for renewal of the tire is provided in a buttress portion, and,
when the circumferential main groove that is on an outermost side in a tire width direction is referred to as an outermost circumferential main groove, and when viewed as a cross-section in a tire meridian direction, when a curved line L is drawn passing through a groove bottom of the outermost circumferential main groove parallel to a profile of the land portion from the outermost circumferential main groove to a tire ground contact edge, an intersection point of the curved line L and the profile of the buttress portion is A,
the outermost circumferential main groove is to the outer side in the tire width direction of the circumferential reinforcing layer,
a width Ws of the circumferential reinforcing layer relative to a tire developed width TDW is in ranges such that 0.65≤Ws/TDW≤0.80,
the mark is a first mark shaped as a rib-shaped protrusion, the first mark extending in a tire circumferential direction,
the buttress portion includes a second mark shaped as a groove-shaped recess, the second mark extending in the circumferential direction,
the intersection point A is positioned between the first mark and the second mark,
a groove bottom gauge t of the outermost circumferential main groove and a distance D from the intersection point A to the first mark in a tire radial direction have a relationship such that −1.0≤D/t≤1.0, taking the outer side in the tire radial direction to be positive, and
the groove bottom gauge t of the outermost circumferential main groove and a distance D' from the intersection point A to the second mark in the tire radial direction have a relationship such that −1.0≤D'/t≤1.0, taking the outer side in the tire radial direction to be positive.

2. The pneumatic tire according to claim 1, wherein the belt layer is to the inner side in the tire radial direction of the curved line L.

3. The pneumatic tire according to claim 1, wherein the belt layer includes a high angle belt, a pair of cross belts disposed on an outer side in the tire radial direction of the high angle belt, a belt cover disposed on the outer side in the tire radial direction of the pair of cross belts, and the circumferential reinforcing layer disposed between the pair of cross belts, on the inner side in the tire radial direction of the pair of cross belts, or on the inner side in the tire radial direction of the high angle belt.

4. The pneumatic tire according to claim 3, wherein a belt angle, as an absolute value, of the belt cover is not less than 10° and not more than 45°.

5. The pneumatic tire according to claim 1, wherein belt cords from which the circumferential reinforcing layer is configured are steel wire, and the circumferential reinforcing layer has not less than 17 ends/50 mm and not more than 30 ends/50 mm.

6. The pneumatic tire according to claim 5, wherein elongation of the belt cords from which the circumferential reinforcing layer is configured when they are components when subjected to a tensile load of 100 N to 300 N is not less than 1.0% and not more than 2.5%.

7. The pneumatic tire according to claim 1, wherein the elongation of the belt cords from which the circumferential reinforcing layer is configured when they are in the tire when subjected to a tensile load of 500 N to 1000 N is not less than 0.5% and not more than 2.0%.

8. The pneumatic tire according to claim 1, wherein the circumferential reinforcing layer is disposed inward in the tire width direction of left and right edges of a narrower cross belt of the pair of cross belts, and a width W of the narrower cross belt and a distance S from an edge of the circumferential reinforcing layer to an edge of the narrower cross belt are in ranges such that $0.03 \leq S/W$.

9. The pneumatic tire according to claim 1, wherein the circumferential reinforcing layer is disposed inward in the tire width direction of left and right edges of the narrower cross belt of the pair of cross belts, and the width W of the narrower cross belt and a width Ws of the circumferential reinforcing layer are in ranges such that $0.60 \leq Ws/W$.

10. The pneumatic tire according to claim 1 applied to a tire with an aspect ratio of 70% or less.

11. The pneumatic tire according to claim 1, wherein the circumferential reinforcing layer is configured by winding a single steel wire in a spiral manner.

12. The pneumatic tire according to claim 1, wherein the circumferential reinforcing layer is configured by a plurality of wires wound spirally around side-by-side to each other, where a number of the plurality of wires is five or fewer.

13. The pneumatic tire according to claim 12, wherein a width of winding per unit when the plurality of wires are wound in multiple layers is not more than 12 mm and the plurality of wires are wound at a slant within a range of ±5° with respect to the tire circumferential direction.

14. The pneumatic tire according to claim 1, wherein the groove bottom gauge t of the outermost circumferential main groove and the distance D from the intersection point A to the first mark in the tire radial direction have a relationship such that $-1.0 \leq D/t \leq 0$.

15. The pneumatic tire according to claim 1, wherein the groove bottom gauge t of the outermost circumferential main groove and the distance D from the intersection point A to the first mark in the tire radial direction have a relationship such that $-0.5 \leq D/t \leq -0.1$.

* * * * *